United States Patent Office 3,592,894
Patented July 13, 1971

3,592,894
TREATMENT OF INTESTINAL HELMINTHIASIS
WITH TETRACHLOROFULVENES
Alvin Wagner and James W. Kessel, Rochester, N.Y.,
assignors to Eastman Kodak Company, Rochester, N.Y.
No Drawing. Filed Dec. 16, 1968, Ser. No. 784,175
Int. Cl. A61k 27/00
U.S. Cl. 424—352                             2 Claims

ABSTRACT OF THE DISCLOSURE

Domestic animals afflicted with intestinal helminthiasis are treated with 1,2,3,4-tetrachlorofulvenes substituted with an aryl radical at the 6 position. The active agent can be administered in pill or capsule form or as a drench but is preferably incorporated in the feed and/or water supplied to the animal.

---

This invention relates in general to animal husbandry and in particular to the control of internal parasites in domestic animals. More specifically, this invention relates to a novel method and composition for treatment of intestinal helminthiasis in domestic animals.

Helminthiasis refers to infestation with, or disease caused by, parasitic worms and is a very common and widespread condition which afflicts both household and farm animals with resulting economic losses amounting to many millions of dollars per year. Extensive research on the control of this disease has been conducted for many years and a wide variety of chemical compounds have been suggested for use as anthelmintic agents. However, the search for effective and commercially practical anthelmintics has provided to be a most difficult undertaking in view of the many exacting requirements that must be met. Thus, for example, an ideal anthelmintic agent for veterinary use should be available at low cost, toxic to a broad spectrum of helminths, effective for a wide variety of host animals, non-injurious to the host animal at the anthelmintically effective dosages, and in a form which is easily administered and adaptable to use in a manner which renders feasible the treatment of large or small numbers of animals. At present, the effectiveness and reliability of known anthelmintic agents for veterinary use is not entirely satisfactory and undesirable side effects or toxicity to the host animal are frequently encountered.

It is toward the objective of providing compounds for treatment of intestinal helminthiasis which are highly active and well tolerated and which are amenable to low cost preparation and ease of administration that the present invention is directed.

In accordance with this invention, intestinal helminthiasis in domestic animals is treated by the method comprising administering to the animal an anthelmintically effective amount of a 1,2,3,4-tetrachlorofulvene substituted with an aryl radical at the 6 position, as hereinafter described in full detail. Although any of the customary methods of administering anthelmintic agents known to the art may be employed, in its preferred aspects the invention pertains to incorporating the aforesaid tetrachlorofulvene in the feed and/or water supplied to the animal.

The tetrachlorofulvenes employed in the method of this invention are compounds of the formula:

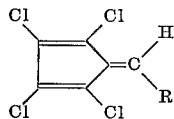

wherein R is an aryl radical of 6 to 18 carbon atoms and can be substituted or unsubstituted and either mononuclear or polynuclear. Of particular interest are compounds in which R represents a halogen-substituted phenyl radical, a lower-alkoxy-substituted phenyl radical (the term "lower alkoxy" being used to mean alkoxy of 1 to 5 carbon atoms), or a lower-acylamido-substituted phenyl radical (the term "lower acylamido" being used to mean acylamido of 2 to 5 carbon atoms).

Illustrative examples of the aforesaid tetrachlorofulvenes include the following compounds:

1,2,3,4-tetrachloro-6-(3,4,5-trimethoxyphenyl)fulvene,
1,2,3,4-tetrachloro-6-(p-chlorophenyl)fulvene,
1,2,3,4-tetrachloro-6-(m-nitrophenyl)fulvene,
1,2,3,4-tetrachloro-6-(9-phenanthryl)fulvene,
1,2,3,4-tetrachloro-6-(3,4-dimethoxyphenyl)fulvene,
1,2,3,4-tetrachloro-6-(p-bromophenyl)fulvene,
1,2,3,4-tetrachloro-6-(4-acetamidophenyl)fulvene,
1,2,3,4-tetrachloro-6-(p-fluorophenyl)fulvene, and the like.

The tetrachlorofulvenes of utility for the purposes of this invention can be prepared by the condensation of an aromatic aldehyde with tetrachlorocyclopentadiene. For example, 1,2,3,4-tetrachloro-6-(p - chlorophenyl)fulvene can be prepared by reacting para-chlorobenzaldehyde with tetrachlorocyclopentadiene and 1,2,3,4-tetrachloro-6-(9-phenanthryl)fulvene can be prepared by reacting 9-phenanthraldehyde with tetrachlorocyclopentadiene. The reaction involved has been described in the chemical literature and for further details reference is made to the following publications:

E. T. McBee et al., J.A.C.S. 77 86 (1955)
J. S. Meek and P. Argabright, J.O.C. 22 1708 (1957)

The method of this invention finds application in the treatment of domestic animals, such as dogs, cats, sheep, goats, cattle, swine and poultry, which are afflcted with intestinal helminths, such as tapeworms.

Treatment with the tetrachlorofulvenes described herein can be effected in any suitable manner known to the art for administering anthelmintic agents which are solids at ordinary temperatures. For example, the active agent can be administered to the animal in the form of pills, tablets, capsules or boluses, it can be formulated as a solution or dispersion in a suitable vehicle and administered by drench, or it can be incorporated in the drinking water and/or food supplied to the animal. The active agent can be administered alone or in combination with suitable carriers, diluents, fillers, thickeners, disintegrating agents, bactericidal agents, sporicidal agents, colorants, and the like, and, if desired, it may be combined with other therapeutic agents utilized in animal husbandry. To facilitate the formulation of tablets, the active agent can be mixed with conventional binding agents such as acacia, gelatin, or polyvinylpyrrolidone. For administration by drench, the active agent can be dispersed in an aqueous medium containing thickening agents, such as the cellulose ethers, and emulsifying or dispersing agents. A particularly convenient method of administration consists in incorporating the active agent into the animal's feed rations in such amounts as will provide a daily minimum intake sufficient to achieve the desired result and, accordingly, preferred compositions within the contemplation of this invention are compositions comprising an animal feedstuff containing an anthelmintically effective amount of one or more of the hereinabove described tetrachlorofulvenes. For this mode of administration, the tetrachlorofulvene should be finely ground and intimately dispersed throughout the feed.

As previously indicated, it is within the contemplation of this invention to administer the tetrachlorofulvene to the animal in any suitable manner and in any anthelmintically effective amount, although, of course, excessively large amounts which might cause harm to the animal should be avoided. The optimum dosage will vary with the particular compound used, the type of animal, the particular species of helminth involved, and the manner of administration, but can be determined without undue difficulty by anyone of ordinary skill in the art. Where the active agent is incorporated in the feed, the concentration used will typically be within the range from about 0.01 to about 1 percent by weight of the feed and more usually from about 0.1 to about 0.5 percent. For the use of tablets, or administration by drench, a dosage of from about 25 to about 1000 milligrams per kilogram of body weight is ordinarily suitable, with preferred dosages being in the range from about 100 to about 500 milligrams per kilogram.

The method of this invention is particularly advantageous by virtue of the fact that while the compositions disclosed are highly effective in treating intestinal helminthiasis they are safe to use and they function in such a manner that undesirable side effects are at a minimum.

The invention is further illustrated by the following examples of its practice.

EXAMPLES 1–8

In each of Examples 1–8, five mice which had been previously exposed to *Hymenolepis nana* eggs per os were fed a diet containing the anthelmintic agent for five days ad libitum, fasted for one day, and then necropsied. To prepare the diet, the anthelmintic agent was mixed with casein and ground with a mortar and pestle, admixed with "Purina Lab Chow" which had been freshly ground in an attrition mill, and then further ground with a mortar and pestle to ensure that the anthelmintic agent was thoroughly dispersed. The amount of anthelmintic agent incorporated in the diet was either 0.5 or 0.1 percent by weight, as hereinafter specified. The control diet employed was identical to the test diet, except that no anthelmintic agent was included, and was fed to two groups of five mice each.

At autopsy, the mice were killed with chloroform and the peritoneal cavity was opened. To examine for the presence of *Hymenolepis nana*, the posterior four to six inches of the small intestine was removed and placed in a finger bowl with a small amount of tap water. The intestine was then slit and the contents examined against a black background and, if no tapeworms were seen, further examined under a dissecting microscope. If all of the mice in the test group were clear of *Hymenolepis nana*, activity of the compound tested is designated herein as "complete," while if there were tapeworms present but the worm burden was obviously less than in the control group, activity of the compound tested is designated herein as "partial." The results obtained are summarized in Table I.

TABLE I

| Example Number | Anthelmintic agent | Percentage in diet | Activity rating |
|---|---|---|---|
| 1 | 1,2,3,4-tetrachloro-6-(3,4,5-trimethoxyphenyl)fulvene. | 0.5 | Complete. |
| 2 | 1,2,3,4-tetrachloro-6-(p-chlorophenyl)fulvene. | 0.5 | Do. |
| 3 | 1,2,3,4-tetrachloro-6-(m-nitrophenyl)fulvene. | 0.5 | Partial. |
| 4 | 1,2,3,4-tetrachloro-6-(9-phenanthryl)fulvene. | 0.5 | Do. |
| 5 | 1,2,3,4-tetrachloro-6-(3,4-dimethoxyphenyl)fulvene. | 0.5 | Complete. |
| 6 | 1,2,3,4-tetrachloro-6-(p-bromophenyl)fulvene. | 0.5 / 0.1 | Do. / Partial. |
| 7 | 1,2,3,4-tetrachloro-6-(4-acetamidophenyl)fulvene. | 0.5 | Complete. |
| 8 | 1,2,3,4-tetrachloro-6-(p-fluorophenyl)fulvene. | 0.5 | Do. |

EXAMPLES 9–12

In each of Examples 9 to 12, five mice which had been previously exposed to *Hymenolepis nana* eggs per os were treated by preparing the anthelmintic agent under test as a dispersion in a liquid vehicle and administering it by stomach tube. To prepare the dispersion, the anthelmintic agent was added to water containing 0.5 percent carboxymethyl cellulose as a thickener and 0.2 percent polyoxyethylene sorbitan monooleate as an emulsifying agent. The mice were dosed at either 500 milligrams of anthelmintic agent per kilogram of body weight per day (mg./kg./day) or at 100 mg./kg./day with both one-day and three-day tests being conducted at each of these levels. In each instance, however, all of the anthelmintic agent for a given day was administered in a single dose. Untreated controls were run with both the one-day and three-day groups and sham-dosed controls (mice closed with water containing 0.5 percent carboxymethyl cellulose and 0.2 percent polyoxyethylene sorbitan mono-oleate) were also run with the three-day groups. At the end of the test period, the mice were fasted for one day, killed with chloroform, autopsied, and examined for *Hymenolepis nana* in the same manner as described in regard to Examples 1 to 8. The results obtained are summarized in Table II with the activity of the anthelmintic agent being designated in the same manner as hereinbefore described.

TABLE II

| Example Number | Anthelmintic agent | Dosage Mg./kg./day | Days | Activity rating |
|---|---|---|---|---|
| 9 | 1,2,3,4-tetrachloro-6-(3,4,5-trimethoxyphenyl)fulvene. | 500 | 3 | Partial. |
| 10 | 1,2,3,4-tetrachloro-6-(p-chlorophenyl)fulvene. | 500 / 500 | 3 / 1 | Do. / Do. |
| 11 | 1,2,3,4-tetrachloro-6-(3,4-dimethoxyphenyl)fulvene. | 500 | 3 | Do. |
| 12 | 1,2,3,4-tetrachloro-6-(p-fluorophenyl)fulvene. | 500 / 500 / 100 | 3 / 1 / 3 | Do. / Do. / Do. |

The invention has been described in detail with particular reference to preferred embodiments thereof, but it will be understood that variations and modifications can be effected within the spirit and scope of the invention.

We claim:

1. A method of treating intestinal *Hymenolepis nana* in domestic animals which comprises orally administering to the animal an amount in the range of from about 0.01 to about 1% by weight of feed or from about 25 to 1000 milligrams per day per kilogram of animal body weight of a tetrachlorofulvene selected from the group consisting of:

1,2,3,4-tetrachloro-6-(3,4,5-trimethoxyphenyl)fulvene,
1,2,3,4-tetrachloro-6-(p-chlorophenyl)fulvene,
1,2,3,4-tetrachloro-6-(m-nitrophenyl)fulvene,
1,2,3,4-tetrachloro-6-(9-phenanthryl)fulvene,
1,2,3,4-tetrachloro-6-(3,4-dimethoxyphenyl)fulvene,
1,2,3,4-tetrachloro-6-(p-bromophenyl)fulvene,
1,2,3,4-tetrachloro-6-(4-acetamidophenyl)fulvene, and
1,2,3,4-tetrachloro-6-(p-fluorophenyl)fulvene.

2. A veterinary composition for control of intestinal *Hymenolepis nana* comprising an animal feedstuff containing an amount in the range of from about 0.01 to about 1% by weight of fed of a tetrachlorofulvene selected from the group consisting of:

1,2,3,4-tetrachloro-6-(3,4,5-trimethoxyphenyl)fulvene,
1,2,3,4-tetrachloro-6-(p-chlorophenyl)fulvene,
1,2,3,4-tetrachloro-6-(m-nitrophenyl)fulvene,
1,2,3,4-tetrachloro-6-(9-phenanthryl)fulvene,
1,2,3,4-tetrachloro-6-(3,4,-dimethoxyphenyl)fulvene,
1,2,3,4-tetrachloro-6-(p-bromophenyl)fulvene,
1,2,3,4-tetrachloro-6-(4-acetamidophenyl)fulvene, and
1,2,3,4-tetrachloro-6-(p-fluorophenyl)fulvene.

References Cited

UNITED STATES PATENTS 2,721,160   10/1955   Newcomer _____ 424—352

SAM ROSEN, Primary Examiner